United States Patent
Tomlinson et al.

(10) Patent No.: US 8,241,459 B2
(45) Date of Patent: Aug. 14, 2012

(54) POLYMER MELT DISTRIBUTOR HEADER DESIGN

(75) Inventors: John Tomlinson, Prairieville, LA (US); Roy Kennedy, Prairieville, LA (US); Jose M. Sosa, Deer Park, TX (US)

(73) Assignee: Fina Technology, Inc., Houston, TX (US)

( * ) Notice: Subject to any disclaimer, the term of this patent is extended or adjusted under 35 U.S.C. 154(b) by 1184 days.

(21) Appl. No.: 11/533,983

(22) Filed: Sep. 21, 2006

(65) Prior Publication Data

US 2008/0075637 A1    Mar. 27, 2008

(51) Int. Cl.
*B01D 19/00* (2006.01)

(52) U.S. Cl. ............... 159/2.1; 528/501; 528/502 R; 96/200; 96/203; 159/43.1; 159/27.4

(58) Field of Classification Search ............ 95/247–248, 95/260, 266; 96/193–194, 200, 202; 528/501, 528/502 R; 261/115–118; 422/129; 159/2.1, 159/27.4, 43.1

See application file for complete search history.

(56) References Cited

U.S. PATENT DOCUMENTS

| | | | |
|---|---|---|---|
| 2,268,360 A | | 12/1941 | Walker |
| 2,343,152 A | | 2/1944 | Marx |
| 2,703,968 A | * | 3/1955 | Berestneff .................. 62/475 |
| 3,228,644 A | | 1/1966 | Sand |
| 4,294,652 A | * | 10/1981 | Newman ................... 159/2.1 |
| 4,637,193 A | * | 1/1987 | Lange ...................... 52/655.1 |
| 4,702,397 A | * | 10/1987 | Gortz ........................ 222/211 |
| 4,727,979 A | * | 3/1988 | Wolfson et al. ............ 198/803.3 |
| 4,863,568 A | * | 9/1989 | Wijn ........................ 202/185.2 |
| 4,972,902 A | * | 11/1990 | Ninomiya .................... 165/70 |
| 5,069,750 A | * | 12/1991 | Aboul-Nasr ................ 159/2.1 |
| 5,118,338 A | | 6/1992 | Moller |
| 5,140,848 A | * | 8/1992 | Spencer ........................ 73/46 |
| 5,540,813 A | * | 7/1996 | Sosa et al. .................. 159/47.1 |
| 5,599,469 A | * | 2/1997 | Yoshino ................... 219/121.55 |
| 5,874,525 A | * | 2/1999 | Krupinski et al. ........ 528/502 R |
| 6,780,281 B1 | * | 8/2004 | Elsner et al. ................ 159/2.1 |
| 2005/0097748 A1 | * | 5/2005 | Corleto et al. ........... 29/890.142 |
| 2007/0291446 A1 | * | 12/2007 | Abram ........................ 361/683 |

OTHER PUBLICATIONS

U.S. Appl. No. 11/345,439, filed Feb. 1, 2006, entitled "Devolatilizer Nozzle."

* cited by examiner

*Primary Examiner* — Duane Smith
*Assistant Examiner* — Ives Wu (57) ABSTRACT

A vessel header comprising a plurality of lateral flow tubes arranged in a parallel configuration and entering the vessel header through alternating header penetrations with a single header penetration per lateral flow tube. A method of increasing the throughput of a polymerization reaction comprising conducting the polymerization reaction in a reaction vessel comprising a plurality of lateral flow tubes arranged in a parallel configuration and entering the vessel header through alternating header penetrations with a single header penetration per lateral flow tube wherein the polymerization reaction displays an increase in throughput of 10% and a decrease in volatiles of from 5% to 10% when compared to a polymerization reaction carried out in a reaction vessel lacking a plurality of lateral flow tubes arranged in a parallel configuration and entering the vessel header through alternating header penetrations with a single header penetration per lateral flow tube.

12 Claims, 10 Drawing Sheets

POLYMER MELT DISTRIBUTOR HEADER DESIGN

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE DISCLOSURE

This disclosure relates generally to fluid exchange vessels. More particularly, it relates to devolatilizer nozzles and methods of distributing fluid within fluid exchange vessels.

BACKGROUND OF THE DISCLOSURE

Polymer may be recovered from a polymerization reactor and fed to a devolatilization vessel where undesirable components such as unreacted monomer or solvent may be removed from the polymer. For example, volatiles may be removed by vacuum distillation, flash devolatilization, stripping, increasing polymer surface area, or combinations thereof. The polymer may be passed through a devolatilizer nozzle, which is an arrangement of one or more flow tubes having a plurality of small perforations or holes directed downward in a vessel for discharging molten polymer in strands. The polymer strands provide increased surface area for devolatilization of the polymer within the vessel. As the strands fall in the devolatilization vessel, the unreacted monomer and solvent is released while the polymer strands collect at the bottom of the vessel. The devolatilized polymer may then be sent to subsequent polymer processing steps. Given the commercial importance of devolatilization, an ongoing need exists for improved devolatilization processes and associated equipment such as solvent exchange vessels incorporating devolatilizer nozzles.

SUMMARY OF THE DISCLOSURE

The foregoing has outlined rather broadly the features and technical advantages of the present disclosure in order that the detailed description of the disclosure that follows may be better understood. Additional features and advantages of the disclosure will be described hereinafter that form the subject of the claims of the disclosure. It should be appreciated by those skilled in the art that the conception and the specific embodiments disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims.

Disclosed herein is a vessel header comprising a plurality of lateral flow tubes arranged in a parallel configuration and entering the vessel header through alternating header penetrations with a single header penetration per lateral flow tube.

Also disclosed herein is a method of increasing the throughput of a polymerization reaction comprising conducting the polymerization reaction in a reaction vessel comprising a plurality of lateral flow tubes arranged in a parallel configuration and entering the vessel header through alternating header penetrations with a single header penetration per lateral flow tube wherein the polymerization reaction displays an increase in throughput of 10% and a decrease in volatiles of from 5% to 10% when compared to a polymerization reaction carried out in a reaction vessel lacking a plurality of lateral flow tubes arranged in a parallel configuration and entering the vessel header through alternating header penetrations with a single header penetration per lateral flow tube.

DETAILED DESCRIPTION OF THE DISCLOSURE

The present disclosure contemplates a vessel header design that may comprise a plurality of lateral flow tubes ("flow tubes"). The spacing between the flow tubes may be minimized through the use of alternating header penetrations. The lateral flow tubes may be welded into the vessel header penetrations, may be externally flanged to the vessel header penetrations, may be internally flanged to the vessel header penetrations, or combinations thereof. Additional features such as staggered external flanges and an internal support structure are disclosed herein and may further allow the spacing between the flow tubes to be minimized. The decreased spacing may result in an increase in the usable flow tube surface area within the vessel header and an associated vessel body, which may cumulatively be known as a fluid distribution system. As a result of the increase in the usable surface area, the throughput capacity of the system may increase relative to conventional designs.

Figure 1A:
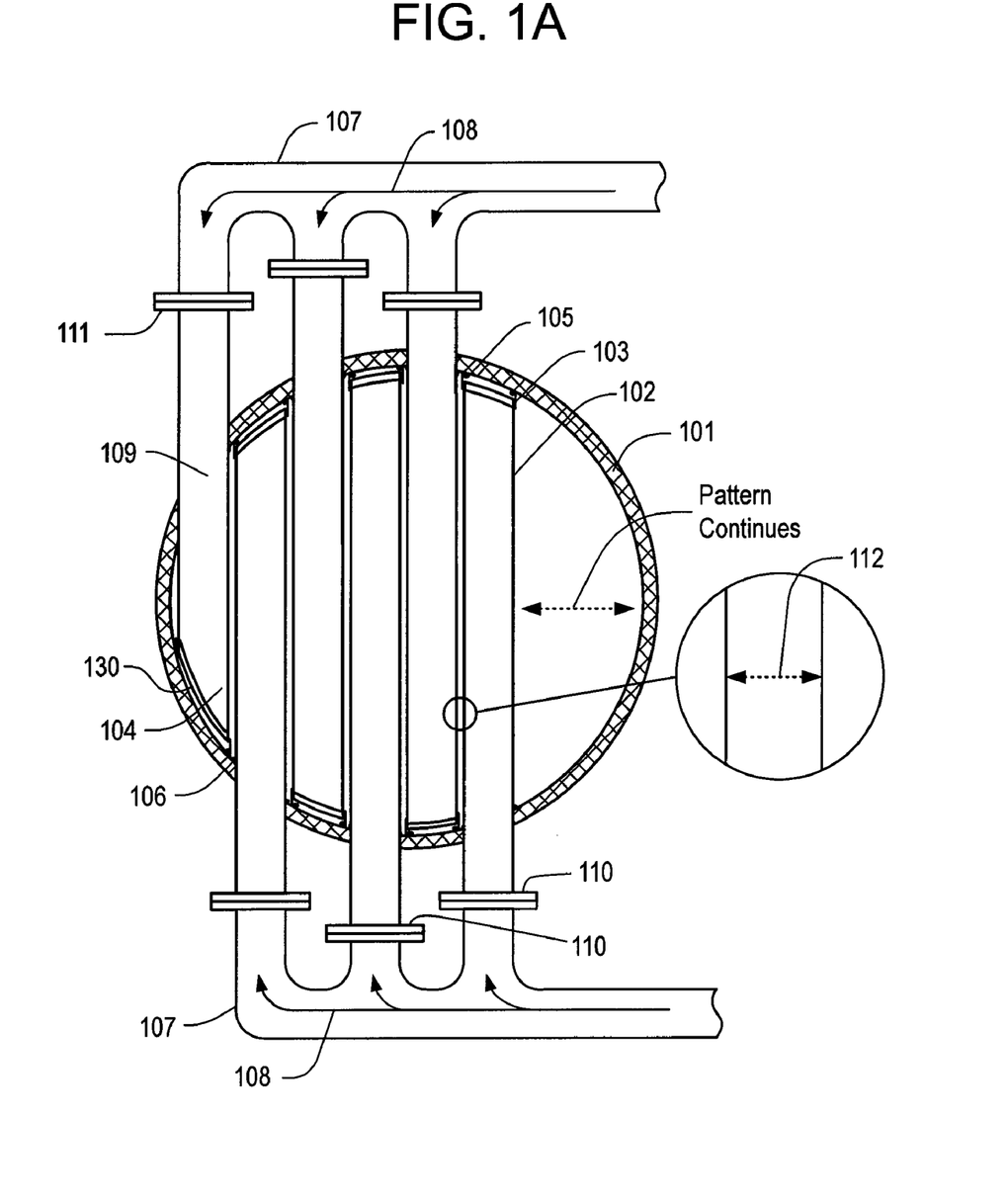
FIG. 1A is a top plan view of a polymer melt distributor vessel header design.
Figure 1B:
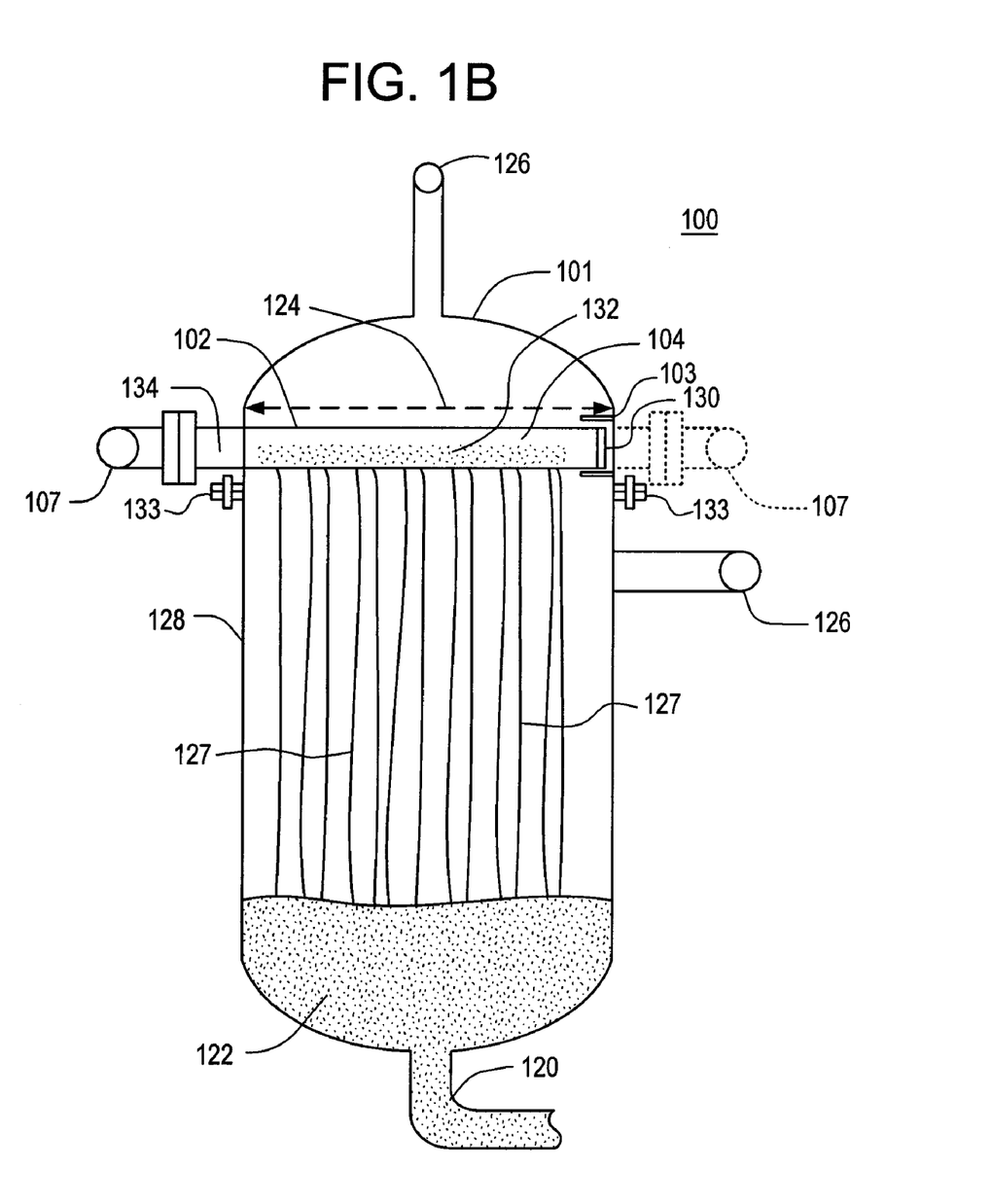
FIG. 1B is a partial side plan view of a polymer melt distributor vessel design.

As shown in FIGS. 1A and 1B, a fluid distribution system may comprise a devolatilizer vessel 100 having a vessel header 101 and a vessel body 128. A devolatilizer vessel 100 may be used to remove the volatile components from a polymer prior to further polymer manufacturing processes such as pelletizing and forming. In an embodiment, a devolatilizer vessel 100 comprises a vessel header 101 disposed above a vessel body 128, a devolatilized polymer outlet 120, a volatile vapor outlet 126, and a plurality of lateral flow tubes 102 disposed within the vessel header 101 for distribution of the polymer within the devolatilizer vessel 100. An external manifold 107 may be used to supply the polymer to the flow tubes 102. The vessel header 101 may be connected to the vessel body 128 through the use of a flanged connection 133, a welded connection, or any other connection method capable of substantially sealing against unintended leakage between the vessel header 101 and the vessel body 128, as would be known to one skilled in the arts. The devolatilized polymer outlet 120 may be connected at or near the bottom of the devolatilizer vessel 100 and is used to convey the devolatilized polymer to downstream processing units. The devolatilized polymer outlet 120 may comprise one or more pipes, connections, or pipes and connections to facilitate polymer collection or to reduce the required pump size. The volatile vapor outlet 126 may be connected at or near the top of the vessel body 128 and/or the vessel header 101 and is used to remove the volatiles that exit the polymer within the devolatilizer vessel 100. The volatile vapor outlet 126 may comprise one or more pipes, connections, or pipes and connections in order to balance vapor flows. In an embodiment, the lateral flow tubes 102 comprise devolatilizer nozzles. The devolatilizer nozzles may be disposed within the vessel header 101 and are intended to convey the polymer containing the volatiles from an upstream process to the devolatilizer vessel 100 interior for devolatilization. FIG. 1A indicates the direction of flow 108 through the lateral flow tubes 102 while FIG. B indicates the direction of polymer flow 124 into the devolitizer vessel 100. The arrangement of the lateral flow tubes 102 in relation to the vessel header 101 will be more fully described herein.

Referring to FIGS. 1A and 1B, the vessel header of the present disclosure offers several advantages and benefits as compared to conventional designs. The use of flanged connections 111 (FIG. 1A), removable parts such as the flow tube end cap 130 (FIG. 1B), and the internal support structure 103 (FIGS. 1A and 1B) allow improved access to the respective components for inspection, cleaning, and maintenance. In addition, the flanged connections 111 and designs disclosed herein allow for changing or replacing flow tubes 102 individually, which allows for repair and modification cost savings and optimization as compared to existing monolithic type designs. The flanged connections 111 also provide a means to blind individual flow tubes 102 to reduce vessel capacity, maintain optimal flow rates and patterns in the vessel header 101, and isolate individual flow tubes due to damage or plugging. The flanged connections 111 also provide the option to introduce orifice plates or restriction plates for polymer distribution management within the vessel header 101 and vessel body 128.

As shown in FIGS. 1A and 1B, the vessel header 101 is disposed adjacent and above the vessel body 128. A plurality of lateral flow tubes 102 is disposed near the interface of the vessel body 128 and vessel header 101 for distribution of a fluid within the vessel body 128. The lateral flow tubes are arranged substantially parallel to a plane of the interface between the vessel header 101 and vessel body 128, and further are arranged substantially perpendicular to the sidewalls of the vessel body 128. The plurality of lateral, substantially parallel flow tubes may form an assembly, for example a devolatilizer nozzle assembly as described in more detail herein. In various embodiments, the flow tube assembly may be considered part of the vessel header 101, part of the uppermost portion of the vessel body 128, part of both the vessel header 101 and the uppermost portion of the vessel body 128, or a component that is separate from both the vessel header 101 and the uppermost portion of the vessel body 128. For convenience, the disclosure herein will describe the flow tubes 102 in relationship to the vessel header 101, with the understanding that such description may apply equally to the vessel body 128.

In an embodiment, each individual flow tube 102 may enter the vessel header 101 through a vessel header penetration 109 and be supported within the vessel header 101 by an internal support structure 103. As used herein, the vessel header penetration 109 comprises any opening created in the vessel header 101 for the purpose of passing a flow tube 102 through to the interior of the vessel header 101, and the internal support structure 103 comprises a device for providing mechanical support to the end of the flow tube 102 opposite the vessel header penetration 109 within the vessel header 101. The vessel header penetrations 109 of nearby flow tubes 102 may be on opposite sides of the vessel header 101 such that vessel header penetrations 109 form an alternating pattern, as more fully described herein. The internal support structure 103 may also form an alternating pattern along the interior of the vessel header 101. The flow tubes 102 may be connected to the vessel header 101 using any method capable of substantially sealing the flow tubes 102 in the vessel header penetration 109 including, for example, welding and flanging. The flow tubes 102 may comprise external flanges 111 in order to sealingly connection to an external distribution manifold 107 in order to convey fluid to the interior of the vessel header 101.

As shown in FIGS. 1A and 1B, the vessel header 101 and vessel body 128 are used to provide a substantially sealed environment for the processing of a fluid. In an embodiment, the vessel header 101 and the vessel body 128 are circular in shape. In an embodiment, the vessel body 128 is substantially cylindrical, conical, or truncated conical in shape and the vessel header is substantially dome-like in shape. Alternatively, the vessel header 101 and the vessel body 128 may have a non-circular shape depending on the specific uses required for the fluid distribution system. In an embodiment, the vessel header 101 and vessel body 128 are composed of a material capable of withstanding a differential pressure between a vessel interior and a vessel exterior as well as an elevated operating temperature. Without intending to be limiting, an example of a suitable material may be steel. The vessel header 101 and vessel body 128 may optionally comprise additional elements such as insulation or reinforcement plating surrounding the vessel header 101 and the vessel body 128.

In an embodiment, the vessel header 101 and vessel body 128 may be components of a polymer devolatilization vessel 100, which may also be known as a solvent exchange vessel. In this embodiment, molten polymer is fed to the polymer devolatilization vessel 100 wherein the polymer is formed into strands 127 upon exiting the flow tubes 102 and the volatiles exit the polymer strands. The polymer strands extend downward in the vessel and form a molten mass 122 of devolatilized polymer in the bottom of the vessel. The devolatilized polymer exits the vessel header 101 via the devolatilized polymer outlet 120, which transmits the devolatilized polymer to a finishing operation such as a pelletizer. The vessel header 101 and vessel body 128 may be sized according to various criteria such as the polymer devolatilization throughput requirements, production rate, material strength, pressure rating, and other factors as known to one of ordinary skill in the art. In an embodiment, the diameter of the vessel header and associated vessel may be between 35 inches and 240 inches, alternatively between 50 and 210 inches, alternatively between 70 inches and 195 inches.

In an embodiment shown in FIGS. 1A and 1B, the plurality of flow tubes 102 are disposed within the vessel header 101 above the vessel body 128. In an embodiment, the vessel header 101 may comprise, in the alternative, a plurality of between 2 and 100, 2 and 90, 2 and 80, 2 and 70, 2 and 60, or 2 and 50 flow tubes 102. The actual number of flow tubes 102 may be a function of vessel size, flow tube size, flow tube shape, production rate, throughput requirements, material strength, and pressure rating requirements. The flow tubes 102 may comprise any type of pipe or conduit intended to convey a fluid with a size capable of being incorporated into a vessel header 101 and a design capable of withstanding the fluid distribution system operating conditions. The flow tube 102 may have a cross sectional shape suitable for its intended use, including a non-circular cross section in some embodiments. In order to facilitate removal and maintenance, the flow tubes 102 may be approximately straight and may optionally have an end cap 130 that may be removable. The end cap 130 may also be used to provide a support for the flow tube 102 within the vessel header 101 and may be shaped to take any internal curvature of the vessel header 101 into account.

In an embodiment shown in FIG. 1B, the lateral flow tubes 102 may be devolatilizer nozzles ("nozzles"), and the terms flow tube and devolatilizer nozzle may be used interchangeably herein. The nozzles 102 comprise a flow section 134 coupled with a perforated section 132. The flow section 134 conducts molten polymer from an external polymer source to the perforated section 132 within the vessel header 101. The perforated section 132 may comprise a plurality of perforations or holes from which molten polymer may exit and form strands 127. Examples of devolatilizer nozzles 102, their use and methods of production may be found in U.S. Patent Nos. 5,540,813, 4,294,652, 4,934,433, 5,118,388, and 5,874,525, U.S. Published Application 2005/0097748, and pending U.S. patent application Ser. No. 11/345,439, which are incorporated herein by reference.

As shown in FIGS. 1A and 1B, the flow tubes 102 disposed within the vessel header 101 may be configured using a parallel and alternating vessel header penetration 109 design in order to increase the number of flow tubes 102 and useable flow tube surface area (e.g., area suitable for perforations 132) within the vessel header 101. In an embodiment, the nozzles 102 may be arranged parallel to one another in order to decrease the nozzle spacing 112 and increase the number of nozzles 102 that may be placed within a vessel header 101. The term flow tube spacing or nozzle spacing 112 as used herein is intended to refer to the closest distance between the outer surfaces of adjacent flow tubes 102 inside the vessel header 101 as measured perpendicular to the surface of the flow tubes 102. The fluid distribution system capacity may be partly determined by the number of perforations or holes 132 within the nozzles 102 through which a polymer may be extruded. As a result, an embodiment utilizing a parallel nozzle 102 arrangement with alternating header penetrations 109 may increase the throughput capacity of the fluid distribution system. In an embodiment, the flow tube spacing 112 may be from 1 to 10 inches, alternatively from 1 to 8 inches, alternatively from 1.5 to 6 inches.

As shown in FIG. 1A, the vessel header penetrations 109 may alternate between sides of the vessel header 101. The internal support structure 103 may be located along the vessel header 101 interior surface opposite the vessel header penetrations 109. An alternating pattern comprising a vessel header penetration 109 located next to an internal support structure 103 such as for example an internal cradle may be created and repeated along the interior surface of the vessel header 101. The alternating pattern of flow tubes may extend across substantially the entire cross section of the vessel header 101, for example across the entire diameter of FIG. 1A.

Figure 2A:
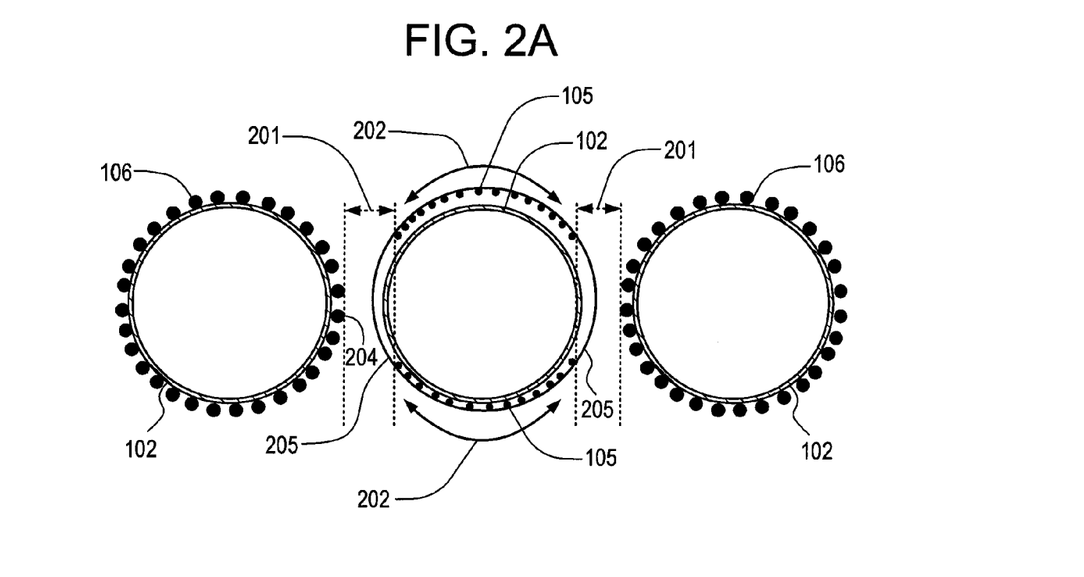
FIG. 2A is a partial cross-sectional view of an internal support structure along the interior wall of the vessel header.

As shown in FIG. 2A, the flow tube spacing 112 may be limited by a weld root spacing 201, where a weld root 204 refers to the point or points at which the back of a weld intersects the base metal surface or surfaces. In an embodiment, the base metal is the vessel header 101 wall. Following industry best practices requires a 1 inch minimum spacing between weld roots, based on the heat affected zone from the weld. The 1 inch spacing avoids potential weld problems due to the stresses present in the heat affected zone of the weld. By avoiding the heat affected zone, stress relieving may be avoided which may reduce fabrication costs and time. In an embodiment, a typical flow tube spacing may be less than or equal to 4 inches, alternatively less than or equal to 3 inches, alternatively less than or equal to 2 inches. By alternating the vessel header penetrations 109 and the internal support structure 103, the minimum weld spacing requirements may still be met and any reinforcing vessel requirements may be more easily met. As used herein, the reinforcing vessel requirements refer to engineering requirements for the construction of vessels as described in ASME section VIII division 1. As a result of the alternating configuration, the flow tube spacing 112 may be decreased, which may allow for more flow tubes 102 to be placed in the vessel header 101, and thereby increasing the perforated area 132.

An internal support structure 103 may be disposed along the interior surface of the vessel header 101 and may be used to support the end 104 of the flow tube 102 within the vessel header 101. The internal support structure 103 design may involve consideration of its ability to alleviate mechanical stresses on the flow tube 102 and allow for thermal expansion and contraction of the vessel header 101 in relation to the flow tube 102. In an embodiment, the internal support structure 103 design may depend on the vessel size, vessel operating conditions, and number and type of flow tubes 102.

Figure 2B:
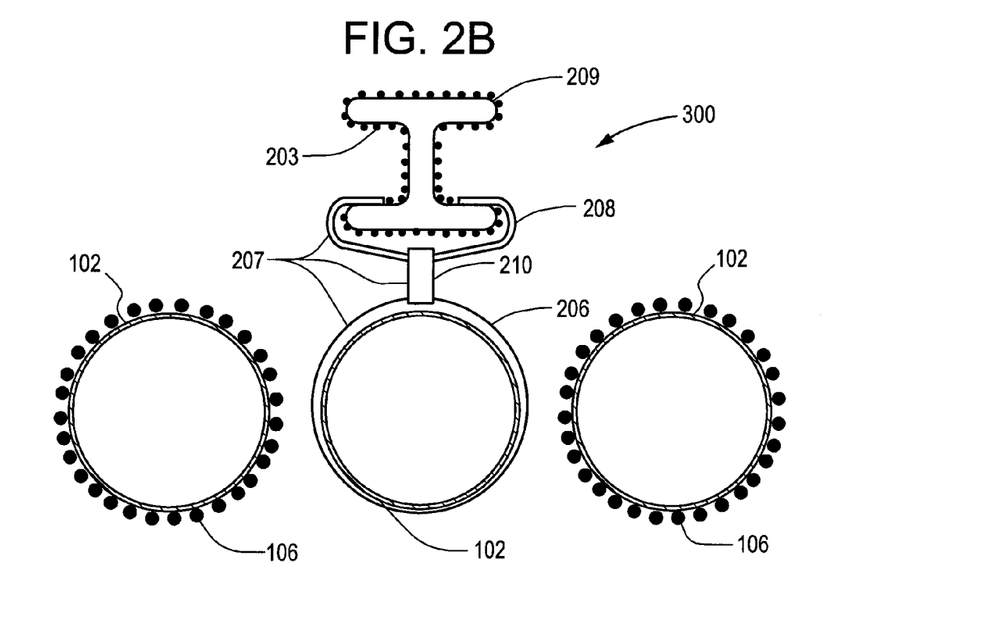
FIG. 2B is a partial cross-sectional view of an alternative internal support structure along the interior wall of the vessel header.
Figure 3A:
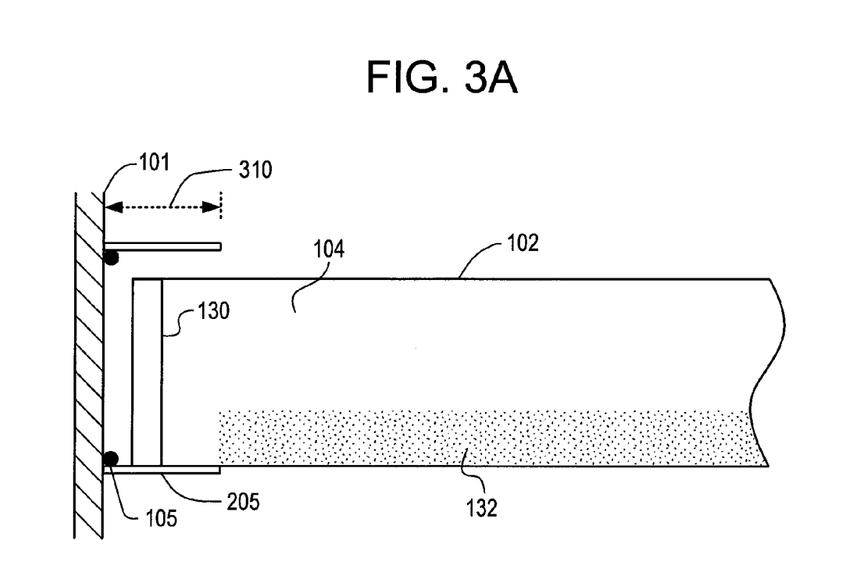
FIG. 3A is a cross-sectional side view of an internal support structure.
Figure 3B:
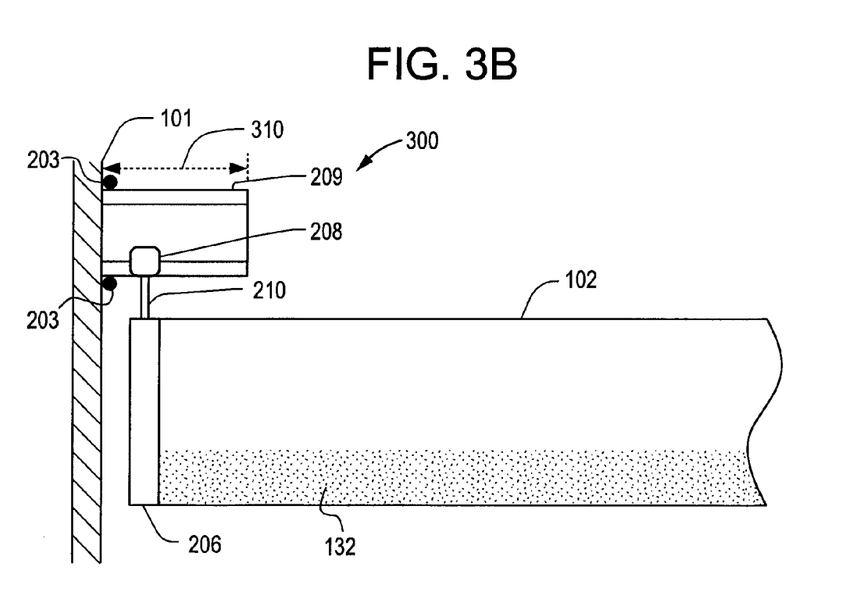
FIG. 3B is a cross-sectional side view of an alternative internal support structure.

In an embodiment shown in FIGS. 2B and 3B, the internal support structure 103 may be a sliding cradle 300. As used herein, the sliding cradle 300 comprises a support structure 209, for example a support beam or rail, located above the flow tube 102 within the vessel header 101 wherein support is provided by a flow tube hanger 207 ("hanger") connecting the support structure 209 and the flow tube 102. In this embodiment, the hanger 207 may move relative to the support structure 209, which may allow for movement in response to thermal expansion or contraction forces. The resulting movement reduces stress on the vessel header 101 wall and the flow tube 102. In an embodiment, the sliding cradle may allow movement of the flow tube 102 of less than or equal to 12 inches, alternatively less than or equal to 3 inches, alternatively less than or equal to 1 inch in order to account for thermal expansion of the vessel header 101 during operation and allow removal of flow tube 102 for maintenance or cleaning purposes. In an embodiment, the support structure 209 may be a section of an I-beam welded to the interior of the vessel header 101. In an alternative embodiment, the support structure 209 may be a section of pipe or conduit. In an embodiment, a typical support structure 209 may extend from the vessel header 101 interior surface approximately horizontally above the flow tube 102 a distance 310 of less than 12 inches, alternatively less than 6 inches, alternatively less than 2 inches.

As shown in FIG. 2B, the hanger 207 may comprise a beam clamp or beam roller 208, a support rod 210, and a pipe clamp, roller, or support 206. The beam clamp or beam roller 208 comprises a device intended to connect to the support structure 209, which may either clamp to the support structure 209 or connect to the support structure 209 while allowing for movement. The pipe clamp, roller, or hanger 206 comprises a device intended to support a flow tube 102. In an embodiment in which the pipe clamp is used, the support may be fixed relative to the flow tube 102, and the use of a roller may allow movement relative to the flow tube 102. The support rod 210 is intended to comprise a mechanical connection between the beam clamp or roller 208 and the pipe clamp, roller or hanger 206. An example of a connection method may be through the use of a support rod 210 with a threaded end secured by a threaded nut. In an alternative embodiment, the hanger 207 may comprise a device in which the beam clamp 208 and support rod 210 comprise a single device that may be directly connected to the flow tube 102, for example, through a welded connection to the top of the flow tube 102. In an embodiment, the flow tube 102 may be a devolatilizer nozzle. In this embodiment, the hanger 207 may be connected to the nozzle 102 at or near the nozzle end 104 or end cap 130 using for example, a weld to the top of the nozzle 102 or a threaded connection extending into the interior of the flow tube 102 that is accessible via the end cap 130. The resulting configuration, which does not obstruct the bottom surface area of the flow tube 102, may allow for an increase in the perforated section 132 of the nozzle 102 within the vessel header 101 relative to other internal cradle embodiments and may increase the fluid distribution system capacity.

In an alternative embodiment as shown in FIGS. 2A and 3A, the internal support structure 103 may be a support cradle 205 on which the flow tube end 104 directly rests. Alternatively, the flow tube end 104 may indirectly rest on the support cradle 205 as a result of a moveable device, such as a sliding sleeve or bearing, being placed between the support cradle 205 and the flow tube end 104 to allow for movement. As used herein, a support cradle 205 refers to any structure capable of supporting a flow tube end 104 including but not limited to a section of pipe of greater diameter than the flow tube end 104 or a half section of pipe oriented such that the flow tube end 104 will rest in a stable position when placed inside. In addition, the support cradle 205 may be shaped as necessary to support a flow tube end 104 based on considerations including but not limited to a non-circular flow tube 102 shape and any angles that may be produced due to a curvature in the interior vessel header 101 surface. In an embodiment, a support cradle 205 may be welded to the interior surface of the vessel header 101 via welds 105, as described in more detail herein. The flow tube end 104 may then be supported by being placed in the support cradle 205. The support cradle 205 may be of any length 310 sufficient to support the flow tube end 104 during operation and maintenance. Several factors may affect the length 310 of the support cradle 205 including but not limited to requirements for thermal expansion and contraction, vessel size, flow tube length and diameter, and vessel operating conditions including operating temperature. Any support cradle 205 length beyond that necessary to support the flow tube end 104 may reduce the surface area of the flow tube 102 for use within the vessel header 101 by covering an area that could otherwise be used for the perforation section 132. In an embodiment, the support cradle 205 may extend the same length 310 from the interior of the vessel header 101 surface as the sliding cradle 300.

Figure 3C:
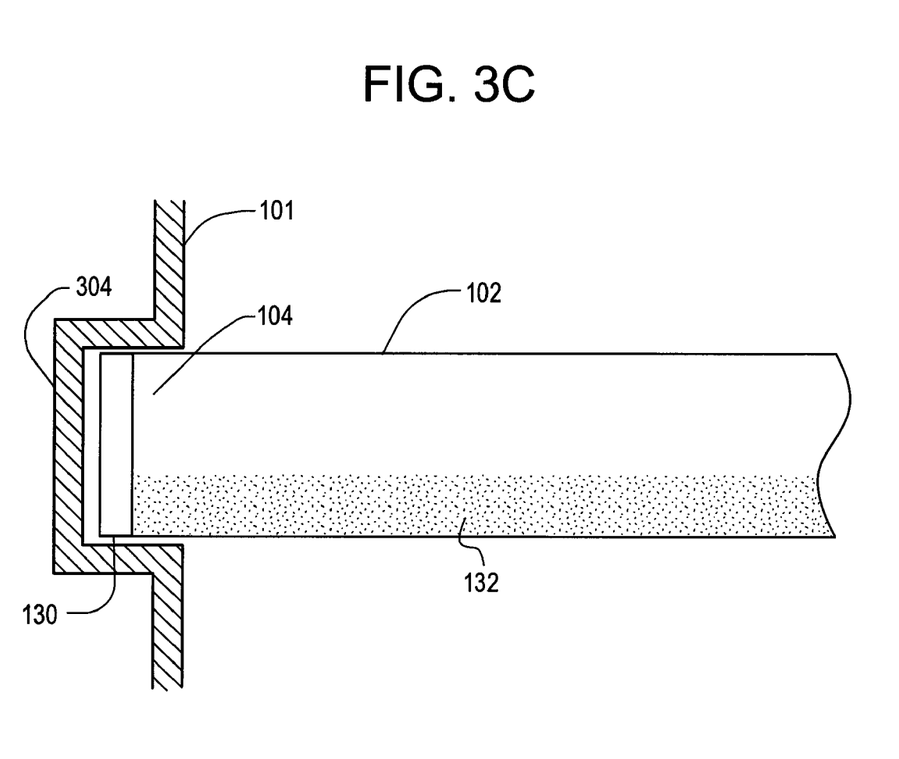
FIG. 3C is a cross-sectional side view of an alternative internal support structure.

In an alternative embodiment shown in FIG. 3C, the flow tube end 104 opposite the vessel header penetration 109 may be supported by the vessel header 101 using a design in which the vessel header 101 forms a support recess 304. In this embodiment, the vessel header 101 is designed such that a small section of the vessel header 101 is recessed outward from the interior of the vessel to allow the flow tube end 104 to pass into the support recess 304 and be supported. The flow tube end 104 may slide in the support recess 304 to allow for movement in response to thermal expansion forces. The flow tube end 104 may rest directly in recess 304 or may rest indirectly in recess 304 as a result of a moveable device, such as a sliding sleeve or bearing, being placed between the upper surface of recess 304 and the flow tube end 104 to allow for movement. The support recess 304 may be sealingly connected to the vessel header 101 as a result of being formed at the same time as the vessel header 101, being welded to the vessel header 101, or any other method known to one skilled in the arts that is capable of forming a substantially sealed connection to the vessel header 101. In an embodiment, the support recess 304 in the vessel header 101 may extend less than or equal to 12 inches, alternatively less than or equal to 6 inches, alternatively less than or equal to 3 inches beyond the outer surface of the vessel header 101. This embodiment may allow the perforated section 132 to extend substantially the entire length between the interior surfaces of the vessel header 101, and thereby maximize the surface area available for perforated section 132.

The internal support structure 103 may be connected to the interior of the vessel header 101. In an embodiment, the internal support structure 103 is welded to the interior of the vessel header 101. The resulting welds and weld roots may result in flow tube spacing 112 requirements that may determine the minimum allowable spacing between flow tubes 102.

In an embodiment shown in FIG. 2B, the sliding cradle 300 may be welded or otherwise connected to the interior of the vessel header 101. The support structure welds 203 are not generally in horizontal alignment with the nearby header penetration welds 106, as welds 203 are shown above the horizontal plane of welds 106 in FIG. 2B. The welds illustrated in FIG. 2B are shown as individual dots for illustration purposes. In an embodiment, the welds may be any type of weld, including but not limited to, spot welds, stitch welds, or seal welds, as would be known to one skilled in the arts. The resulting weld configuration may reduce or eliminate any complications with meeting the ASME weld requirements, which may reduce installation difficulty. In addition, this weld configuration may reduce complications in maintaining the industry best practice of a minimum 1-inch spacing between weld roots, and may allow for a reduction in flow tube spacing 112 relative to other cradle embodiments. In an embodiment, the flow tubes 102 may be devolatilizer nozzles. In this embodiment, the use of a sliding cradle 300 to decrease the flow tube spacing 112 may allow for an increase in the number of nozzles 102 within a vessel header 101, may increase the perforated nozzle area 132 within the vessel header 101, and may increase the associated throughput capacity of the fluid distribution system.

In an embodiment shown in FIG. 2A, a support cradle 205 may be welded or otherwise connected to the interior surface of the vessel header 101. In an embodiment in which a support cradle 205 is welded to the interior surface of the vessel header 101, the support cradle weld 105 may be located along a portion or portions of the support cradle 205 interior so as to form a weld arc 202 along the support cradle 205 bottom, top, or both. As used herein a weld arc 202 refers to a section of a weld or group of welds that extend in an arc along the inner perimeter of the support cradle 205 but does not continue around the entire support cradle 205 perimeter. In an embodiment, the use of a weld arc 202, and in particular a weld arc interior to the support cradle 205, to connect the support cradle 205 to the interior vessel header 101 surface may impact the weld root spacing 201 requirements including the minimum 1-inch spacing between weld roots. The weld arc 202 may be continued around the bottom, top, or the bottom and top of the support cradle 205 to the extent that the weld arc 202 would not be closer than the minimum weld spacing 201 to an adjacent header penetration weld 106. In an embodiment in which the support cradle 205 comprises a section of pipe or conduit of greater diameter than the flow tube 102, the support cradle 205 may be connected to the interior vessel header 101 surface using a weld arc 202 placed along the inner perimeter of the support cradle top, bottom, or both. Placement of the weld arc 202 along the inner, rather than the outer, support cradle 205 joint allows the weld arc 202 to be extended further around the interior of the support cradle 205 without violating the 1-inch requirement. In an alternative embodiment, the support cradle 205 may comprise a half section of pipe. In this embodiment, the weld arc 202 may be placed along the lower, inner perimeter of the support cradle to the extent that the weld arc 202 is not located closer than the required minimum weld root spacing 201 as determined by industry best practices, which may avoid potential weld problems due to the stresses present in the heat affected zone of the weld. By avoiding the heat affected zone, no stress relieving is required which may reduce fabrication costs and time.

The plurality of lateral flow tubes 102 disposed within the vessel header 101 may enter the vessel header 101 through vessel header penetrations 109. The vessel header penetrations 109 may be substantially sealed against unintended leakage through the use of a sealed connection between the flow tube 102 and the vessel header 101. Examples of suitable connections include welded and flanged connections. In an embodiment in which the flow tube 102 is sealingly connected to the vessel header 101 using a flanged connection, the same flanged connection may be used to form a sealing connection to the external distribution manifold 107, which may be used to convey a fluid to the flow tubes 102.

Figure 4:
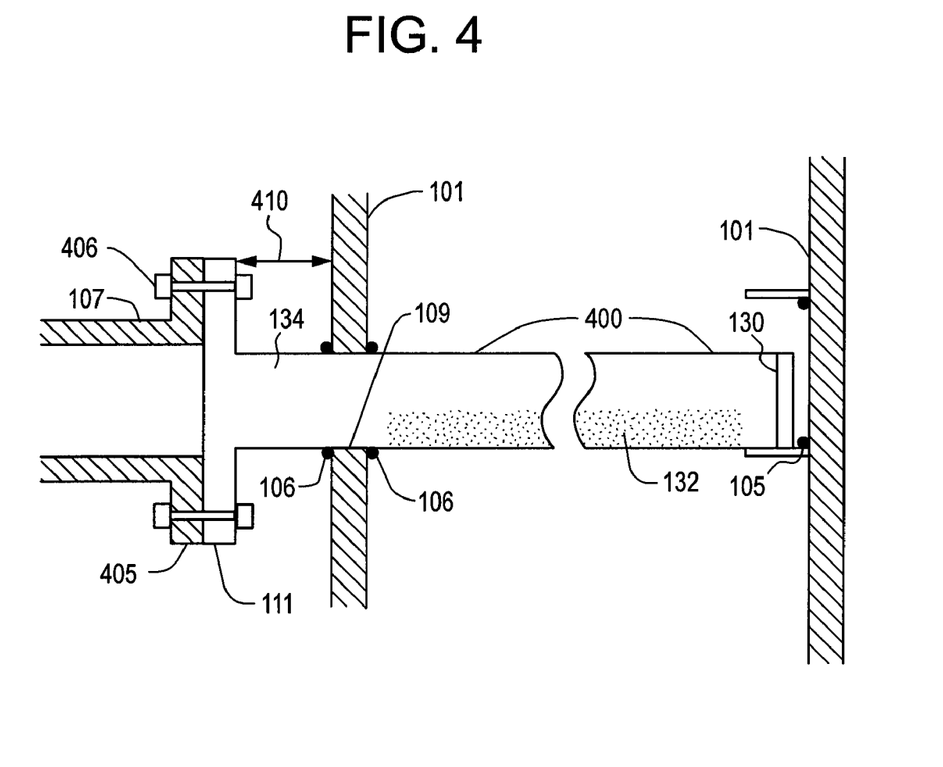
FIG. 4 is a cross-sectional side view of a welded lateral flow tube connection.

In an embodiment shown in FIG. 4, welded flow tubes 400 may be connected directly to the vessel header 101 through the use of welded connections 106 at the vessel header penetrations 109. The welded connections 106 are intended to structurally and sealingly connect the welded flow tube 400 to the vessel header 101 while maintaining the vessel header's structural integrity. Since the welded flow tube 400 is welded to the vessel header 101 at the vessel header penetration 109, it is fixed and cannot be removed. The welded flow tube 400 may then be connected to an external manifold 107 through the use of external manifold flange 405, flanged connection 111 on flow tube 400, and a connection device 406. In an embodiment a connection device 406 may comprise a set of bolts in addition to a sealing mechanism, which may be required to prevent leakage into or out of the vessel header from the flange. The sealing mechanism may be packing, welding, special washers, use of a stud flange, or any other means or methods known to those skilled in the arts. In an embodiment, the welded flow tube 400 may comprise a devolatilizer nozzle. In this embodiment, the perforated portion 132 of the nozzle 400 may be wholly contained within the vessel header 101 while the flow section 134 continues from the vessel header 101 interior through the vessel header 101 wall for connection to the external manifold 107 via an external manifold flange 405. While FIGS. 4-6 each show the end of the flow tube supported via a support cradle 205, it should be understood that other supports such as sliding cradle 300 or support recess 304 may be used in combination with any of the flange embodiments described herein.

Figure 5:
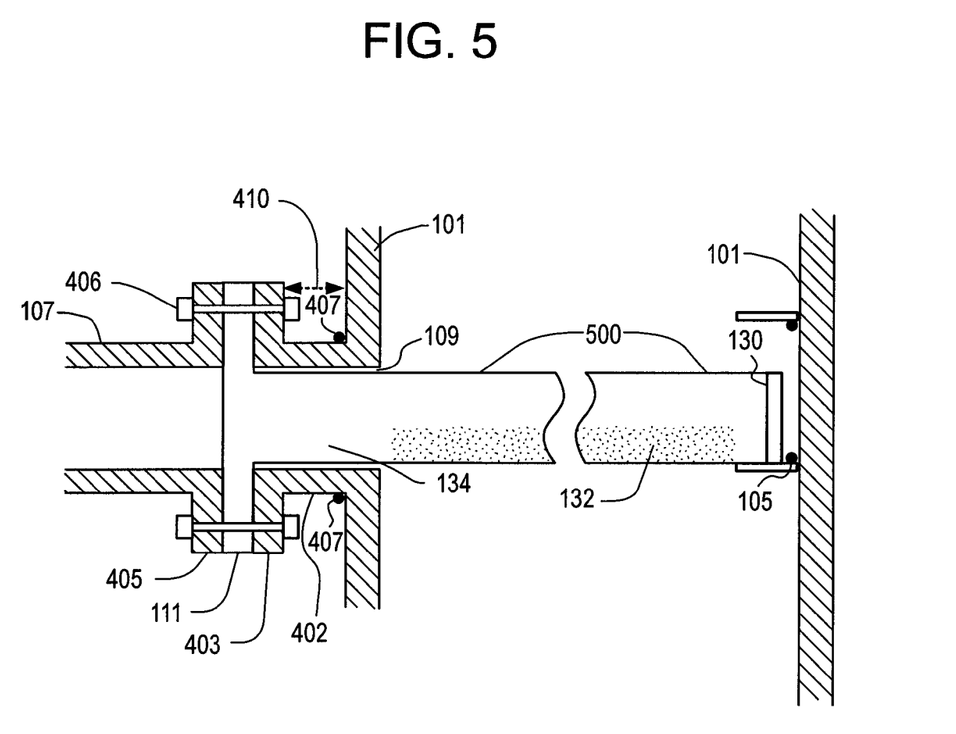
FIG. 5 is a cross-sectional side view of an externally flanged lateral flow tube connection.

In an alternative embodiment shown in FIG. 5, the flow tubes 500 may be externally flanged to the vessel header penetrations 109. An externally flanged flow tube 500 refers to a flow tube 500 that is sealingly connected to the vessel header 101 using a short section of pipe or conduit 402 that is larger in diameter than the flow tube 400. The section of conduit is welded via welds 407 or otherwise connected to the exterior of the vessel header 101 and extended a short distance from the vessel. In an embodiment, a typical externally flanged flow tube 400 connection may extend a distance 410 from the vessel header 101 outer surface ranging from 48 in to 1 in, alternatively from 18 in to 3 in, alternatively from 12 in to 6 in. In an embodiment, a typical externally flanged flow tube 400 connection may have a diameter ranging from 2 inches to 36 inches, alternatively from 8 inches to 24 inches, alternatively from 10 inches to 20 inches. The extended end of the pipe or conduit 402 may have a flange 403 to receive the external flange 111 of flow tube 500 and a flanged connection 405 to an external manifold 107. The smaller diameter externally flanged flow tube 500 passes through the section of conduit 402 into the vessel header 101. The external manifold flange 405 may be connected to the external flow tube flange 111 and the conduit flange 403 with a connection device 406 such as a set of bolts and a sealing mechanism. Examples of sealing mechanisms include packing, washers, welding, stud flanges, and the like. This embodiment may allow the externally flanged flow tube 500 to be removed for cleaning or maintenance by removing the flange connection device 406. In an embodiment, the externally flanged flow tube 500 may comprise a devolatilizer nozzle. In this embodiment, the flow section 134 of the nozzle 500 may extend from the external flow tube flange 111 to near the inside wall of the vessel header 101, and the perforated section 132 may extend across the vessel 101 interior. This embodiment combines a nearly wall to wall perforated section 132, or a complete wall to wall perforated section when used in combination with recess 304, with the ability to remove the nozzle 500 for cleaning and maintenance.

Figure 6A:
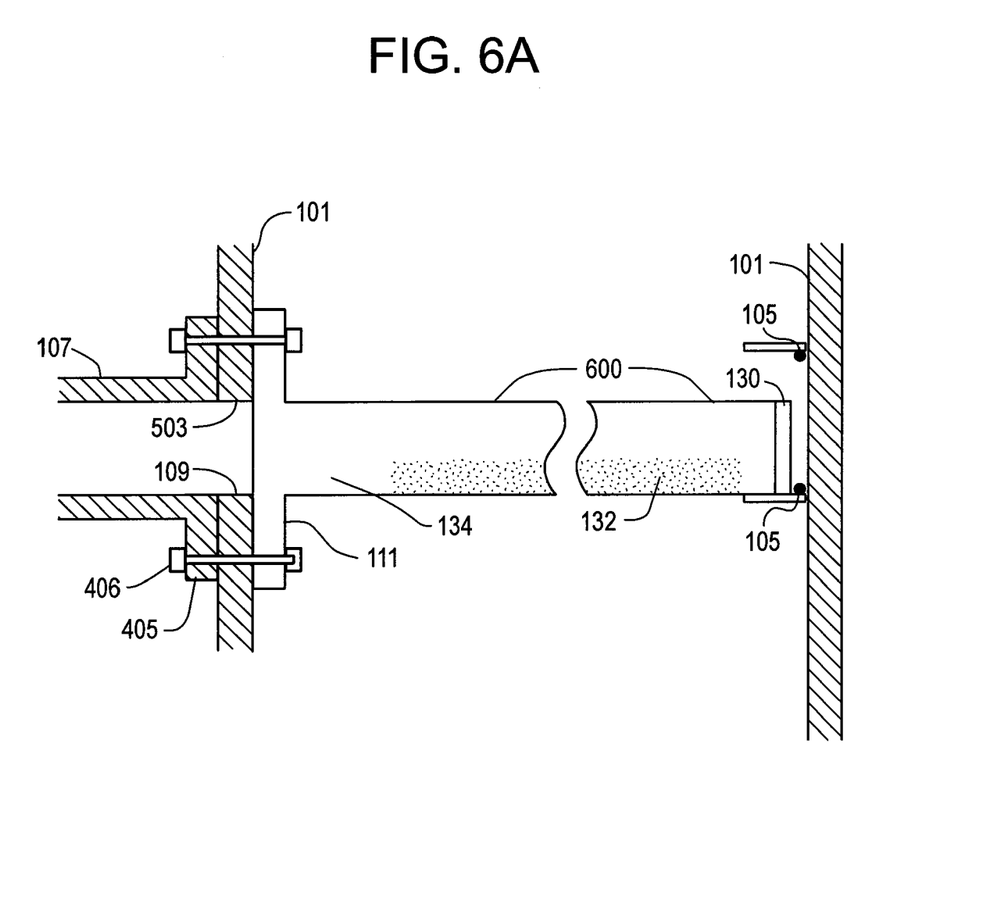
FIG. 6A is a cross-sectional view of an internally flanged lateral flow tube connection.

In an alternative embodiment as shown in FIG. 6A, an internally flanged flow tube 600 may be internally flanged to a vessel header penetration 109. The internally flanged flow tube 600 may refer to a connection in which the vessel header 101 has a flanged connection in the vessel header wall 503, and the internally flanged flow tube 600 has a flanged end 111 that is coupled to the connection in the vessel header wall 503. Fluid is supplied by an external manifold 107 that is flanged 405 to the external surface of the vessel header wall 503. The external manifold 107, the vessel header wall connection 503, and the flow tube flange 111 are coupled together using a connection device 406, such as a set of bolts and a sealing mechanism. In an embodiment, the internally flanged flow tube 600 may be a devolatilizer nozzle. In this embodiment, the perforated portion 132 of the nozzle 600 may be reduced relative to an externally flanged nozzle 400, 500 because the section of the nozzle 600 near the flow tube flange 111 on the inside of the vessel header 101 cannot be perforated. The internally flanged nozzle 600 may be removed for cleaning by removal of the flange connection device 406. The internally flanged nozzle 600 design may result in a reduced fluid distribution system throughput capacity relative to the externally flanged nozzle 400, 500 configuration due to the reduction in the perforated area 132 of the internally flanged nozzle 600.

Figure 6B:
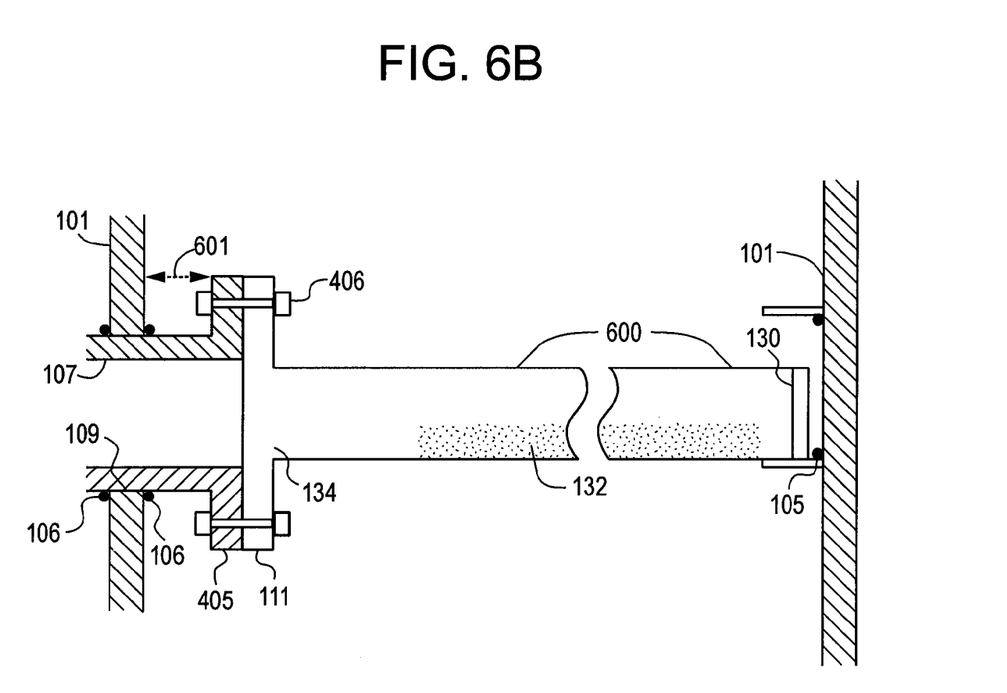
FIG. 6B is a cross-sectional view of an alternative internally flanged lateral flow tube connection.

In an alternative embodiment shown in FIG. 6B, the internally flanged flow tube 600 may be flanged within the vessel header 101. In this embodiment, the manifold flange 405 is welded into the vessel header penetration 109 with header penetration welds 106. The manifold flange 405 may extend into the vessel header a distance 601 of 1/2 to 3 inches. The manifold flange 405 is then flanged to the internally flanged flow tube 600 within the vessel header 101. The manifold flange 405 and the internally flanged flow tube flange 111 are coupled together using a connection device 406, such as a set of bolts and a sealing mechanism. In an embodiment, the internally flanged flow tube 600 may be a devolatilizer nozzle 600. In this embodiment, the perforated portion 132 of the nozzle 600 may be reduced relative to an externally flanged nozzle 400, 500 due to the extension of the manifold flange 405 within the vessel header 101. This embodiment allows the internally flanged nozzle 600 to be removed for cleaning and maintenance by removal of the flange connection device 406.

Returning to FIG. 1A, the header penetration external flanges 111 may optionally be staggered 110 in order to decrease the flow tube spacing 112 and increase the number of flow tubes 102 within the vessel header 101. In an embodiment, the external flanges 111 may comprise the flanged ends of flow tubes 400 that are welded into the vessel header penetrations 109 or the flanged connections 111 of externally flanged flow tubes 500. In some embodiments, the diameter of the external flange 111 may be large enough so that adjacent flanges would be in contact or overlap if they were aligned. In an embodiment, the external flanges 111 may be staggered 110 such that the external flanges 111 do not align, or do not directly align, with adjacent external flanges 111. As used herein, staggered alignment refers to the arrangement of external flanges 111 outside the vessel header 101 in a direction perpendicular to the external flange's longitudinal axis such that adjacent flanges are not in an approximately horizontal plane. Such staggered alignment, configuration, or pattern (as shown in FIGS. 4 and 5) may be achieved by varying the distance 410 from the vessel header 101 to adjacent external flanges. The staggered configuration 110 may result in a decrease in flow tube spacing 112 and an increase in the number of flow tubes 102 that can be placed in a vessel header 101. The decrease in spacing 112 is limited by the minimum weld root spacing 201 requirements. In an embodiment, the flow tubes 102 may be devolatilizer nozzles with staggered 110 external flanges 111. This embodiment may allow a greater number of nozzles 102 to be placed in a vessel header 101, which may increase the perforated nozzle area 132 and the fluid distribution system capacity.

An external manifold 107 may supply fluid to the flow tubes 102. The alternating vessel header penetration 109 design may require that more than one external manifold 107 be used to supply fluid to the vessel header 101 flow tubes 102. In an embodiment, the flow tubes 102, which may be present in an even number, may be supplied fluid by two external manifolds 107. This embodiment results in the same number of flow tubes 102 being supplied by each external manifold 107, which may simplify the external manifold 107 design and facilitate even fluid distribution. In an alternative embodiment, the plurality of flow tubes 102 may comprise an odd number of flow tubes 102.

Figure 7:
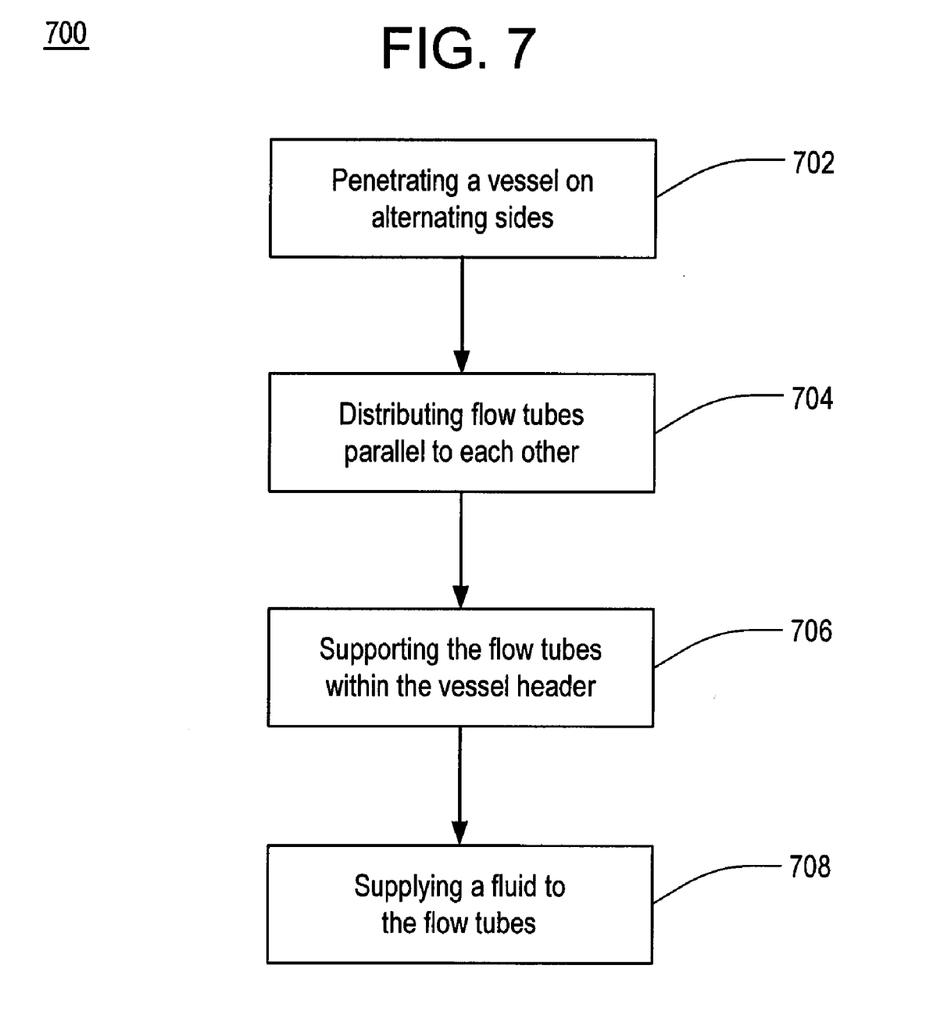
FIG. 7 is a flow chart of a method of distributing a fluid within a vessel.

A method 700 of distributing a fluid within a fluid distribution system such as devolatilizer vessel 100 may comprise the use of a vessel header 101 coupled to a vessel body 128 of the disclosed design. The disclosed method 700 may comprise penetrating 702 a vessel header on alternating sides, distributing 704 flow tubes 102 parallel to each other within the vessel header 101, supporting 706 the flow tubes 102 opposite the vessel header penetrations 109 within the vessel header 101, and supplying 708 a fluid to the flow tubes 102.

The steps of the disclosed method may be carried out in any order that may achieve the desired results. While more than one order may culminate in the distribution of a fluid, the following discussion is presented to illustrate one particular order that may be used.

Initially, a vessel header 101 may be penetrated 702 so that flow tubes 102 may be inserted into the vessel header 101. The vessel header penetrations 109 may be arranged so that the flow tubes 102 within the vessel header 101 are inserted from alternating sides of the vessel header 101. The vessel header penetrations 109 in the vessel header 101 may be made using any method sufficient to create a penetration in the vessel header 101 capable of receiving a flow tube 102 while maintaining the vessel header 101 structural integrity. Methods of making such vessel header penetrations 109 may be known to one skilled in the arts. The vessel header penetrations 109 may be substantially sealed against leakage using a welded or flanged connection at the vessel header penetration 109. Examples of specific types of connections available have been disclosed herein.

Following the creation of vessel header penetrations 109, flow tubes 102 may be distributed 704 into the vessel header penetrations 109 in a parallel configuration. A parallel configuration refers to an alignment of the flow tubes 102 such that the flow tube's primary axis, i.e. its longitudinal axis, is in parallel alignment with an adjacent flow tube's primary axis. In the disclosed method, the flow tubes 102 may be distributed such that the flow tubes 102 enter the vessel header 101 through alternating header penetrations 109. In this method, a flow tube 102 within a vessel header 101 will have entered the vessel header 101 through a vessel header penetration 109 on the opposite side through which the adjacent flow tube entered the vessel header 101. As previously discussed in this disclosure, the distribution of flow tubes 102 through alternating vessel header penetrations 109 may allow the flow tube spacing 112 to be reduced, which may allow for additional flow tubes 102 to be placed in the vessel header 101.

The distributed flow tubes 102 may then be supported 706 within the vessel header 101 through the use of the disclosed internal support structure 103. The internal support structure 103 is intended to support a flow tube end 104 opposite the vessel header penetration 109 through which the flow tube 102 entered. Supporting the flow tube 102 within the vessel header 101 may eliminate the need for two vessel header penetrations 109 per flow tube 102, which may reduce thermal stresses on the vessel header 101. The reduction in vessel header penetrations 109 may also allow the flow tube spacing 112 to be reduced due to the elimination of a header penetration weld 106. Supporting the flow tubes 102 within the vessel header 101 may therefore increase the number of flow tubes 102 within a vessel header 101, and the fluid distribution system throughput capacity.

Once the flow tubes 102 have been distributed 704 and supported 706 within a vessel header 101, a fluid may be supplied 708 to the flow tubes 102. Any method capable of supplying a fluid to a flow tube 102 may be used and may be known to one skilled in the arts. In the disclosed method, a fluid may be supplied to the flow tubes 102 through the use of an external manifold 107. As discussed in this disclosure, the external manifold 107 may comprise external manifold flanges 405 arranged in a staggered configuration for connection to the external flange 111. In a method in which the flow tubes 102 are devolatilizer nozzles, the fluid may be a polymer and may be supplied to the nozzles 102 for devolatilization within the fluid distribution system, which may be a devolatilizer vessel in an embodiment. The use of the disclosed method 700 may result in a fluid being distributed within the fluid distribution system. The disclosed method 700 may allow the flow tube spacing 112 to be reduced and an increased number of flow tubes 102 to be included within the vessel header 101.

The devolatizer as disclosed herein may provide improvements in polymer production when compared to a conventional devolatizer. In an embodiment, the devolatizer disclosed herein may exhibit an improved throughput rate, an increase in the amount of volatiles removed from the polymeric material or both. In an embodiment, the devolatizer disclosed herein results in a 5% increase in the amount of volatiles removed from the polymer material, alternatively a 10% increase in the amount of volatiles removed from the polymer material, alternatively a 20% increase in the amount of volatiles removed from the polymer material, alternatively a 30% increase in the amount of volatiles removed from the polymer material, alternatively a 40% increase in the amount of volatiles removed from the polymer material, alternatively a 50% increase in the amount of volatiles removed from the polymer material, alternatively a 60% increase in the amount of volatiles removed from the polymer material, alternatively a 70% increase in the amount of volatiles removed from the polymer material, alternatively a 80% increase in the amount of volatiles removed from the polymer material, alternatively a 90% increase in the amount of volatiles removed from the polymer material, alternatively a 100% increase in the amount of volatiles removed from the polymer material. In an embodiment, the devolatizer disclosed herein exhibits a 10% increase in throughput, alternatively a 15% increase in throughput, alternatively a 20% increase in throughput, alternatively a 25% increase in throughput, alternatively a 30% increase in throughput.

While embodiments of the disclosure have been shown and described, modifications thereof can be made by one skilled in the art without departing from the spirit and teachings of the disclosure. The embodiments described herein are exemplary only, and are not intended to be limiting. Many variations and modifications of the disclosed design are possible and are within the scope of the disclosure. Where numerical ranges or limitations are expressly stated, such express ranges or limitations should be understood to include iterative ranges or limitations of like magnitude falling within the expressly stated ranges or limitations (e.g., from 1 to 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the disclosed embodiments of the present disclosure. The discussion of a reference herein is not an admission that it is prior art to the present disclosure, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A polymer melt distribution header comprising:
   a plurality of lateral flow tubes arranged in a parallel configuration wherein the lateral flow tubes enter the header through alternating header penetrations with a single header penetration per lateral flow tube and;
   an internal support structure for support of the lateral flow tube within the header opposite the header penetration wherein the internal support structure accommodates horizontal expansion or contraction of the lateral flow tube wherein the internal support structure is a sliding cradle further comprising a support rail located opposite the header penetration and above the lateral flow tube and a sliding hanger connecting the support rail and the lateral flow tube.

2. The header of claim 1 wherein the lateral flow tubes are welded into the header penetrations.

3. The header of claim 1 wherein the lateral flow tubes are internally flanged to the header penetrations.

4. The header of claim 1 wherein the lateral flow tubes are externally flanged to the header penetrations.

5. The header of claim 4 wherein the external flanges are arranged in a staggered configuration.

6. The header of claim 1 wherein the lateral flow tubes are welded into the header penetrations and are externally flanged to an external manifold.

7. The header of claim 1 wherein the lateral flow tubes are externally flanged to the header penetrations and to an external manifold.

8. The header of claim 1 wherein the lateral flow tubes are internally flanged to the header penetrations and to an external manifold.

9. The header of claim 6 wherein the lateral flow tubes comprise devolatilizer nozzles having a perforated area extending substantially the entire length of the flow tubes from the header penetrations to the internal support structure.

10. The header of claim 7 wherein the lateral flow tubes comprise devolatilizer nozzles having a perforated area extending substantially the entire length of the flow tubes from the header penetrations to the internal support structure.

11. The header of claim 1 wherein the lateral flow tubes comprise devolatilizer nozzles having a perforated area for discharging molten polymer in strands.

12. A polymer melt distribution header comprising:
    a plurality of lateral flow tubes arranged in a parallel configuration wherein the lateral flow tubes enter the header through alternating header penetrations with a single header penetration per lateral flow tube and;
    an internal support structure for support of the lateral flow tube within the header opposite the header penetration wherein the internal support structure accommodates horizontal expansion or contraction of the lateral flow tube wherein the internal support structure comprises a support cradle located opposite the header penetration on which the flow tube rests and the support cradle is exterior to the header wall.

* * * * *